United States Patent
French et al.

(10) Patent No.: US 9,326,041 B2
(45) Date of Patent: Apr. 26, 2016

(54) MANAGING QUALITY OF EXPERIENCE FOR MEDIA TRANSMISSIONS

(71) Applicants: International Business Machines Corporation, Armonk, NY (US); University College Dublin, Dublin (IE)

(72) Inventors: Paul B. French, Cork (IE); James P. Galvin, Jr., Georgetown, KY (US); Patrick W. McDonagh, Churchtown (IE); Patrick J. O'Sullivan, Ballsbridge (IE)

(73) Assignees: International Business Machines Corporation, Armonk, NY (US); University College Dublin, Dublin (IE)

( * ) Notice: Subject to any disclaimer, the term of this patent is extended or adjusted under 35 U.S.C. 154(b) by 71 days.

(21) Appl. No.: 14/028,781

(22) Filed: Sep. 17, 2013

(65) Prior Publication Data

US 2015/0082366 A1 Mar. 19, 2015

(51) Int. Cl.
| | |
|---|---|
| *H04N 7/173* | (2011.01) |
| *H04N 21/647* | (2011.01) |
| *H04N 21/2662* | (2011.01) |
| *H04N 21/24* | (2011.01) |

(Continued)

(52) U.S. Cl.
CPC ......... *H04N 21/64761* (2013.01); *H04H 60/29* (2013.01); *H04L 65/80* (2013.01); *H04N 17/004* (2013.01); *H04N 21/238* (2013.01); *H04N 21/2402* (2013.01); *H04N 21/2407* (2013.01); *H04N 21/2662* (2013.01); *H04N 21/6371* (2013.01); *H04N 21/6473* (2013.01)

(58) Field of Classification Search
CPC .............. H04N 21/24; H04N 21/2402; H04N 21/2405; H04N 21/2404; H04N 21/238; H04N 21/23805; H04N 21/2385
USPC .......................................... 725/107, 124, 125
See application file for complete search history.

(56) References Cited

U.S. PATENT DOCUMENTS

| | | | |
|---|---|---|---|
| 6,357,028 B1 | 3/2002 | Zhu | |
| 6,983,323 B2 | 1/2006 | Cantrell et al. | |

(Continued)

FOREIGN PATENT DOCUMENTS

| | | |
|---|---|---|
| EP | 1362485 B1 | 8/2008 |
| EP | 2 530 969 A1 | 5/2012 |

OTHER PUBLICATIONS

Mu Mu et al., "Framework for the Integrated Video Quality Assessment," Multimedia Tools and Applications, Dec. 28, 2011, pp. 1-31.

*Primary Examiner* — James R Sheleheda
(74) *Attorney, Agent, or Firm* — Brian J. Colandreo, Esq.; Jeffrey T. Placker, Esq.; Holland & Knight LLP

(57) ABSTRACT

A computer-implemented method, computer program product, and computing system is provided for quality of experience for media transmissions. In an implementation, a method may include defining a lower media stream discontinuity threshold. The method may also include evaluating a media stream discontinuity rate associated with a portion of a media stream. When the media stream discontinuity rate associated with the portion of the media stream is greater than the lower media stream discontinuity threshold, the method may further include determining a quality of experience associated with the portion of the media stream based upon, at least in part, a payload associated with the portion of the media stream.

17 Claims, 6 Drawing Sheets

(51) Int. Cl.
*H04N 21/238* (2011.01)
*H04N 21/6371* (2011.01)
*H04H 60/29* (2008.01)
*H04N 17/00* (2006.01)
*H04L 29/06* (2006.01)

(56) References Cited

U.S. PATENT DOCUMENTS

| | | |
|---|---|---|
| 7,072,305 B1* | 7/2006 | Gregson .................... H04L 1/24 370/241 |
| 7,617,509 B1 | 11/2009 | Brunheroto et al. |
| 8,284,259 B2 | 10/2012 | Karacali-Akyamac |
| 2002/0053053 A1* | 5/2002 | Nagai et al. .................... 714/712 |
| 2005/0120124 A1 | 6/2005 | Korhonen |
| 2005/0262529 A1 | 11/2005 | Neogi et al. |
| 2007/0242655 A1* | 10/2007 | Li ........................... H04L 12/24 370/352 |
| 2008/0192119 A1* | 8/2008 | Li et al. .......................... 348/180 |
| 2008/0259962 A1* | 10/2008 | Mori .................. H04N 21/4305 370/498 |
| 2009/0158326 A1 | 6/2009 | Hunt et al. |
| 2009/0276821 A1 | 11/2009 | Amento et al. |
| 2011/0301947 A1* | 12/2011 | Anandakumar .. H04L 29/06027 704/219 |
| 2012/0226987 A1* | 9/2012 | Wie .................... G06F 17/30861 715/736 |
| 2012/0311173 A1* | 12/2012 | Agarwal ............. H04L 43/0829 709/231 |
| 2014/0233587 A1* | 8/2014 | Liu ..................... H04L 12/5695 370/468 |
| 2014/0267787 A1* | 9/2014 | Fitzpatrick ......... G06K 9/00744 348/192 |
| 2014/0269275 A1* | 9/2014 | Jun ........................ H04W 36/22 370/230 |
| 2015/0082366 A1* | 3/2015 | French ............... H04N 21/6371 725/116 |
| 2015/0120896 A1* | 4/2015 | Dunne ................ H04L 41/0896 709/223 |
| 2015/0135246 A1* | 5/2015 | Dunne ................. H04N 17/004 725/109 |
| 2015/0138994 A1* | 5/2015 | Dadheech ........... H04L 41/5067 370/249 |
| 2015/0142146 A1* | 5/2015 | Dunne .................. G06Q 10/10 700/94 |
| 2015/0189394 A1* | 7/2015 | French .................. H04N 19/44 725/109 |

* cited by examiner

MANAGING QUALITY OF EXPERIENCE FOR MEDIA TRANSMISSIONS

TECHNICAL FIELD

The present disclosure generally relates to systems and method for transmitting media, and more particularly relates to managing quality of experience for media transmissions.

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other. Alternatively, multiple people may participate on a public website in which they may post entries that are published for multiple people to read. Examples of such websites may include but are not limited to product/service review sites, social networks, and topical blogs. The Internet may further be used to distribute content to users. For example, video content may be simultaneously multicast to a plurality of users in a fashion similar to the way that cable television networks transmit content to end users.

SUMMARY OF DISCLOSURE

According to an implementation, a computer-implemented method may include defining a lower media stream discontinuity threshold. The method may also include evaluating a media stream discontinuity rate associated with a portion of a media stream. When the media stream discontinuity rate associated with the portion of the media stream is greater than the lower media stream discontinuity threshold, the method may also include determining a quality of experience associated with the portion of the media stream based upon, at least in part, a payload associated with the portion of the media stream.

One or more of the following features may be included. Defining the lower media stream discontinuity threshold may be based upon, at least in part, one or more media stream dimensions. Determining the quality of experience associated with the portion of the media stream may include decoding a payload of the portion of the media stream. The method may also include reducing a bandwidth requirement of the media stream when the quality of experience is unsatisfactory.

The method may include increasing the lower media stream discontinuity threshold when the quality of experience associated with the portion of the media stream is satisfactory. The method may further include defining an upper media stream discontinuity threshold. Determining the quality of experience associated with the portion of the media stream may include determining the quality of experience associated with the portion of the media stream when the media stream discontinuity rate associated with the portion of the media stream is less than the upper media stream discontinuity threshold. The method may further include decreasing the lower media stream discontinuity threshold when the quality of experience associated with the portion of the media stream is unsatisfactory.

According to another implementation, a computer program product includes a computer readable storage medium having a plurality of instructions stored on it. When executed by a processor, the instructions may cause the processor to perform operations including defining a lower media stream discontinuity threshold. The instructions may also cause to processor to evaluate a media stream discontinuity rate associated with a portion of a media stream. When the media stream discontinuity rate associated with the portion of the media stream is greater than the lower media stream discontinuity threshold, the instructions may further cause the processor to determine a quality of experience associated with the portion of the media stream based upon, at least in part, a payload associated with the portion of the media stream.

One or more of the following features may be included. Defining the lower media stream discontinuity threshold may be based upon, at least in part, one or more media stream dimensions. The instructions for determining the quality of experience associated with the portion of the media stream may include instructions for decoding a payload of the portion of the media stream. Instructions may also be included for reducing a bandwidth requirement of the media stream when the quality of experience is unsatisfactory.

Instructions may be for increasing the lower media stream discontinuity threshold when the quality of experience associated with the portion of the media stream is satisfactory. Instructions may also be included for defining an upper media stream discontinuity threshold. Determining the quality of experience associated with the portion of the media stream may include determining the quality of experience associated with the portion of the media stream when the media stream discontinuity rate associated with the portion of the media stream is less than the upper media stream discontinuity threshold. Instructions may be included for decreasing the lower media stream discontinuity threshold when the quality of experience associated with the portion of the media stream is unsatisfactory.

According to yet another implementation, a computing system may include a processor and a memory architecture coupled with the processor. The processor may be configured for defining a lower media stream discontinuity threshold. The processor may also be configured for evaluating a media stream discontinuity rate associated with a portion of a media stream. When the media stream discontinuity rate associated with the portion of the media stream is greater than the lower media stream discontinuity threshold, the processor may be configured for determining a quality of experience associated with the portion of the media stream based upon, at least in part, a payload associated with the portion of the media stream.

One or more of the following features may be included. Determining the quality of experience associated with the portion of the media stream may include decoding a payload of the portion of the media stream. The processor may also be configured for reducing a bandwidth requirement of the media stream when the quality of experience is unsatisfactory.

The processor may be further configured for increasing the lower media stream discontinuity threshold when the quality of experience associated with the portion of the media stream is satisfactory. The processor may be configured for defining an upper media stream discontinuity threshold. Determining the quality of experience associated with the portion of the media stream may include determining the quality of experience associated with the portion of the media stream when the media stream discontinuity rate associated with the portion of the media stream is less than the upper media stream discontinuity threshold. The processor may be further configured for decreasing the lower media stream discontinuity threshold when the quality of experience associated with the portion of the media stream is unsatisfactory.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
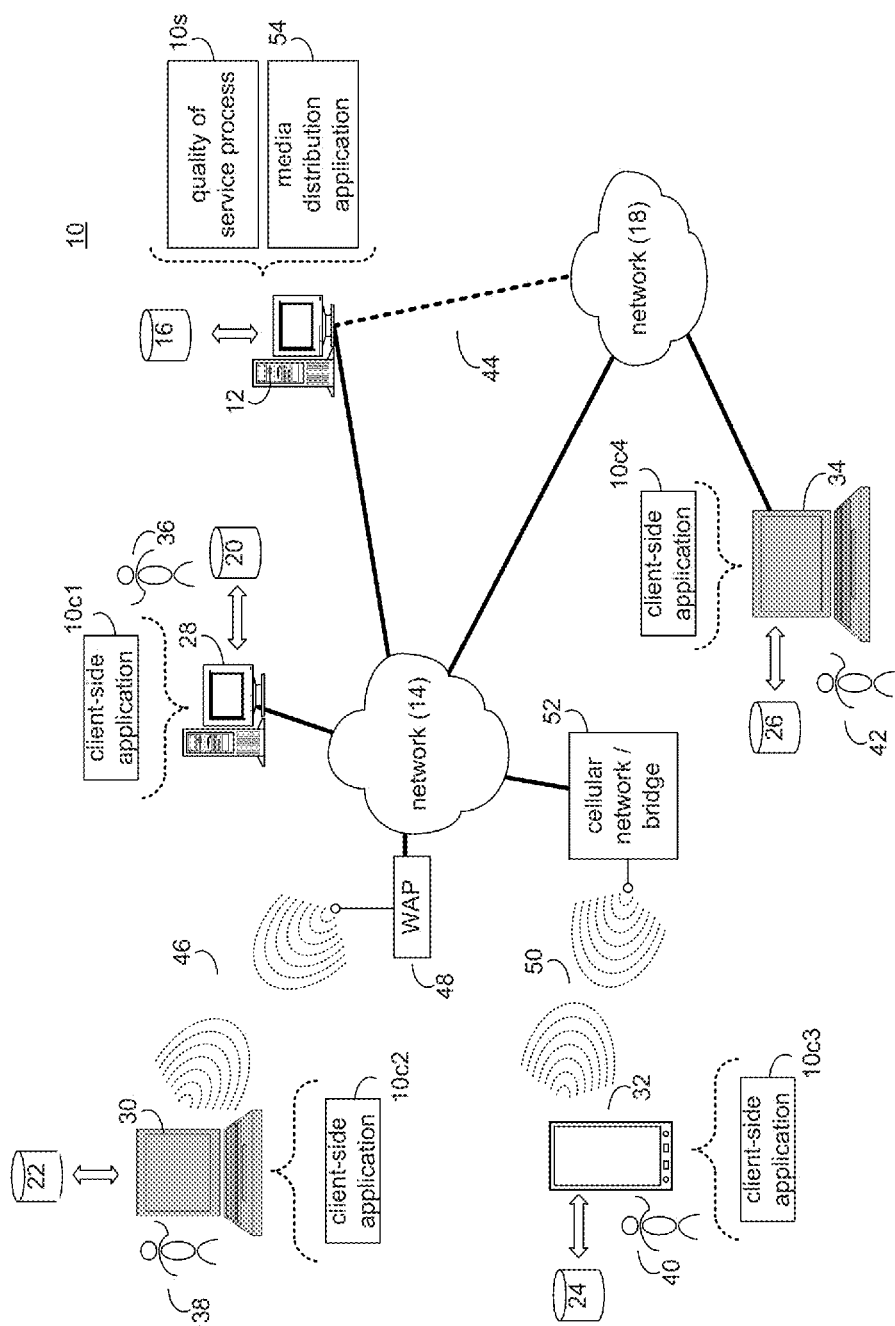
FIG. 1 is a diagrammatic view of a distributed computing network including a computing device that executes a quality of experience process according to an implementation of the present disclosure.

Media distribution over data networks, such as local area networks, wide area networks, the Internet, and the like, have greatly increased the ease with which media content, such as video content, can be shared between users and distributed or broadcast to end consumers of the media content. For example, video media content such as movies, television content, as well as other video content, may be easily distributed to viewers over the Internet or other data networks utilizing a variety of media streaming or distribution systems, such as webTV, IPTV (i.e., internet protocol TV), as well as various other media distribution systems. While the quality of experience of the end consumer of distributed media, such as streaming video or the like, is a consideration for media distribution systems, the quality of experience of the end consumer may be particularly important for paid services (e.g., whether paid via end consumer subscriptions or the like, or through advertising associated with the distributed media). While the description herein may generally relate to video media, it will be appreciated that the features and aspects described herein may, in many embodiments, be equally applicable to other media types, including, but not limited to, audio media.

While the quality of the video leaving the source of the video content (e.g., video head-end) for the video distribution system may often be of sufficient quality to achieve a desired end consumer quality of experience, the quality of experience realized by the end user may, in some instances, be significantly degraded. For example, as the video travels through the network the quality of the video may be degraded, e.g., as a result of lost packets, delay, jitter, etc. As such, the quality of the video arriving at an end point (e.g., such as client computing device, or other playback or consumption device) may be reduced to a degree that the quality of experience of the consumer, or end user, of the streaming video system may be impaired. In some embodiments, basic internet protocol (e.g., "IP") metrics such as jitter, delay, and packet loss can be monitored along the network path between the source of the video content and the end-user device (e.g., end-point), as well as any point in between, may be monitored. In some embodiments, monitoring the actual video quality, e.g., in terms of transport stream errors which can affect playback, may provide a more meaningful indication of the user quality of experience.

In some situations, monitoring the actual video quality for a video stream may be a relatively computationally intensive and/or expensive task. For example, in some systems, monitoring the actual video quality for a media stream may include decoding video stream packets and analyzing the included frames of video data. The computational expense associated with monitoring of quality of experience associated with a delivered video content may place practical limitations on the quantity of video quality analysis that may be performed, especially in a real-time, or near real-time manner.

According to an embodiment, methods and systems may be provided for monitoring quality of experience associated with streaming media content (such as streaming video) while reducing the computational expense of continuously monitoring the quality of the delivered video. In some embodiments, various metrics associated with the streaming video may be measured and/or monitored at a relatively low cost (e.g., in terms of computations costs, computing resources, required hardware and/or systems, and the like). Some such metrics associated with the video stream may be indicative, but not necessarily determinative, of a quality of experience of the streaming video at an end user device. In some embodiments, the value associate with such a metric may be utilized for deciding when, or if, a more in depth analysis of the video quality may be advantageously undertaken.

For example, a metric that may be associated with a video stream may include packet discontinuities. In such an embodiment, a level of packet discontinuities associated with the video stream may be indicative of a quality of experience of the streaming video at an end user device. Packet discontinuities may indicate lost packets, and/or packets that are so delayed that the packets may not be utilized for the purpose of providing streaming video content at the end user device. According to an embodiment, a threshold for packet discontinuities associated with a video stream may be defined. The threshold may be defined such that a level of packet discontinuities below the threshold may be considered to be small enough that the quality of experience associated with the video stream may be considered to be satisfactory. Further, in some embodiments, the threshold may be defined such that a level of packet discontinuities above the threshold may be considered to be large enough to possibly render the quality of experience associated with the video stream unsatisfactory. In some embodiments, a second threshold of packet discontinuities may be defined. The second threshold of packet discontinuities may be considered to be large enough that the quality of experience provided by the video stream is in fact unsatisfactory. It will be appreciated that a satisfactory quality of experience and an unsatisfactory quality of experience may be defined according to various user defined standards, default standards, and/or may otherwise be defined. According to some embodiments, the level of packet discontinuities may be monitored and/or measured be one or more network nodes between the source of the video content and the end user consumption device, including by the end user consumption device.

In an embodiment, resources may be conserved, at least in part, by conducting video quality analysis on portions of the streaming video content (e.g., which may be broadcast or transmitted as an MPEG Transport Stream, or other suitable media stream) having, and/or subsequent to, measured levels of packet discontinuities that are at, or above, the threshold level that may be considered large enough to possibly render the quality of experience associated with the video stream unsatisfactory. For example, when the level of packet discontinuity is low enough that the quality of experience associated with the video steam is considered to be satisfactory, it may not be necessary to determine the quality of experience associate with the video stream. As such, for levels of packet discontinuities below the threshold, the quality of experience associated with the video stream may be assumed to be satisfactory, and therefore may be assumed to not require monitoring or evaluation of the quality of service. In some embodiments utilizing a second threshold for packet discontinuities, which may be associated with a maximum level of packet discontinuities at which a satisfactory quality of service may be considered possible, resources may be conserved by not conducting video quality analysis on such portions, or subsequent portions, of the video stream. That is, for example, when the level of packet discontinuities is so high that it is assumed that the quality of service of the video stream is unsatisfactory, it may not be necessary to evaluate the quality of service of the video stream. Accordingly, in some embodiments, the quality of service of the video stream may only be evaluated (e.g., by decoding the packets associated with the video stream and analyzing the quality of the video stream) for those levels of packet discontinuities at which the quality of experience of the video stream may possibly by satisfactory or may be unsatisfactory. As such, it may not be necessary to evaluate the quality of every frame of video.

According to various embodiments, the level of packet discontinuities that may be considered to be associated with a satisfactory quality of experience, an unsatisfactory quality of service, and/or a possibly unsatisfactory quality of service may be empirically determined. For example, a quality of experience may be evaluated for video streams having different levels of packet discontinuities. A threshold level of packet discontinuities may, in this manner, be determined at which the quality of experience of the video stream is always satisfactory. Similarly, a threshold level of packet discontinuities may be determined at which the quality of experience of the video stream is always unsatisfactory. As such, in some embodiments, the first and/or the second threshold of packet discontinuities may be based on, at least in part, historical data. According to some embodiments, one or more of the thresholds may be defined based upon, at least in part, a characteristic of the video content. According to some embodiments, one or more of the thresholds may be dynamically and/or adaptively defined and/or refined.

Referring to FIG. 1, there is shown quality of experience process 10. For the following discussion, it is intended to be understood that quality of experience process 10 may be implemented in a variety of ways. For example, quality of experience process 10 may be implemented as a server-side process, a client-side process, or a server-side/client-side process.

For example, quality of experience process 10 may be implemented as a purely server-side process via quality of experience process 10s. Alternatively, quality of experience process 10 may be implemented as a purely client-side process via one or more of client-side application 10c1, client-side application 10c2, client-side application 10c3, and client-side application 10c4. Alternatively still, quality of experience process 10 may be implemented as a server-side/client-side process via server-side quality of experience process 10s in combination with one or more of client-side application 10c1, client-side application 10c2, client-side application 10c3, and client-side application 10c4. In such an example, at least a portion of the functionality of quality of experience process 10 may be performed by quality of experience process 10s and at least a portion of the functionality of quality of experience process 10 may be performed by one or more of client-side application 10c1, 10c2, 10c3, and 10c3.

Accordingly, quality of experience process 10 as used in this disclosure may include any combination of quality of experience process 10s, client-side application 10c1, client-side application 10c2, client-side application 10c3, and client-side application 10c4.

Figure 2:
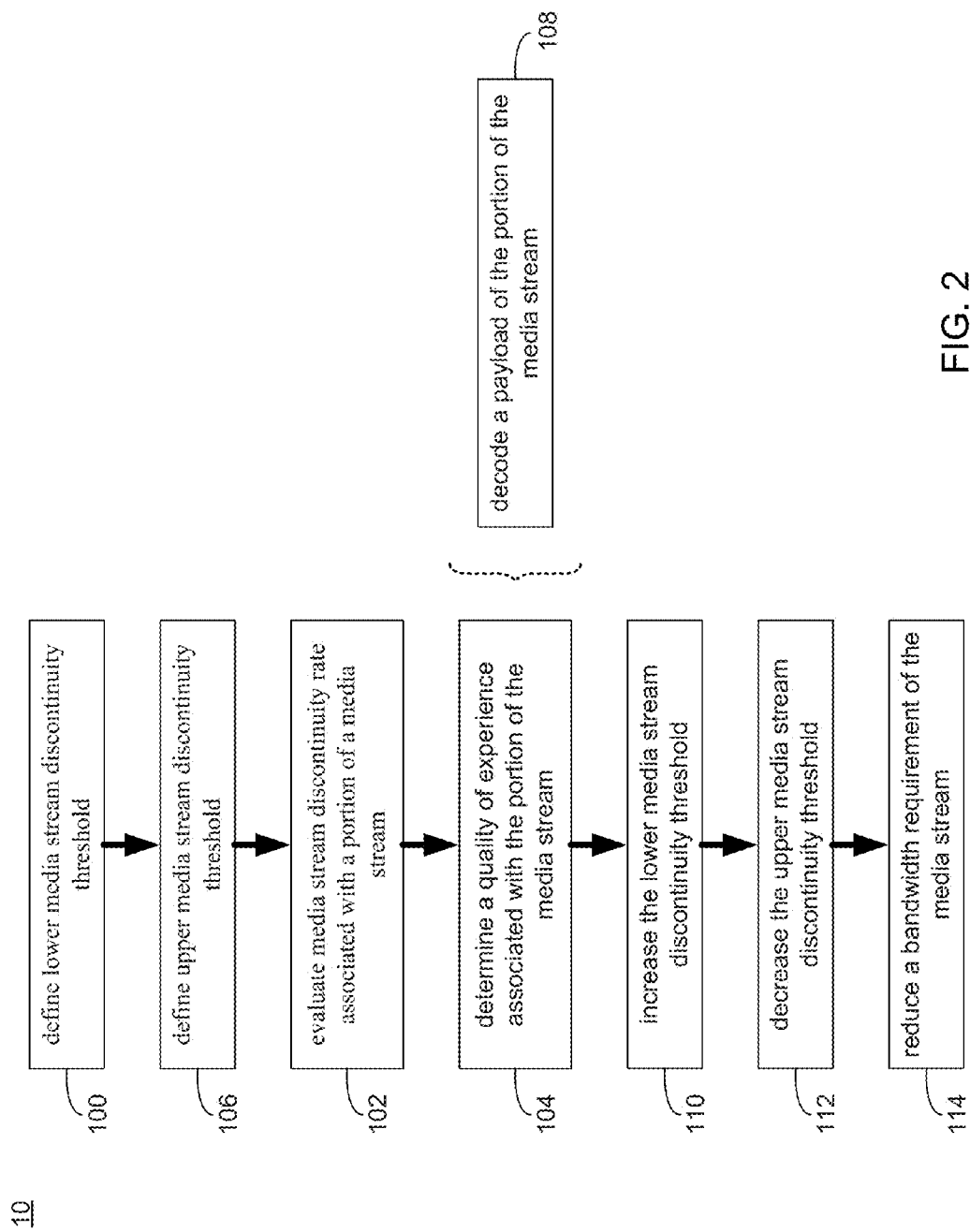
FIG. 2 is a flowchart of the quality of experience process of FIG. 1, according to an implementation of the present disclosure.

Referring also to FIG. 2, and as will be discussed in greater detail below, quality of experience process 10 define 100 a lower media stream discontinuity threshold. Quality of experience process 10 may also evaluate 102 a media stream discontinuity rate associated with a portion of a media stream. When the media stream discontinuity rate associated with the portion of the media stream is greater than the lower media stream discontinuity threshold, quality of experience process 10 may further determine 104 a quality of experience associated with the portion of the media stream based upon, at least in part, a payload associated with the portion of the media stream.

Quality of experience process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of quality of experience process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to, one or more of a media consumption application, a video playback application, a web browser, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a set-top box, a data-enabled television console (not shown), and a dedicated network device (not shown). Client electronic devices 28, 30, 32, 34 may each execute an operating system.

Users 36, 38, 40, 42 may access quality of experience process 10 directly through network 14 or through secondary network 18. Further, quality of experience process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 46 established between laptop computer 30 and wireless access point (WAP) 48. Similarly, mobile computing device 32 is shown wirelessly coupled to network 14 via wireless communication channel 50 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

In some embodiments, quality of experience process 10 may communicate with, interact with, and/or include a component or module of a media distribution application, (e.g., media distribution application 54). In an embodiment, media distribution application 54 may be capable of providing internet protocol television (IPTV) services, internet television, streaming video, or otherwise providing media content to client applications (e.g., client applications 10c1, 10c2, 10c3, 10c4) over a packet switched network. In an embodiment, media distribution application 54 may provide multicast media transmissions, unicast media transmissions, and/or combinations of multicast and unicast transmissions (e.g., which may be transmitted via one or more of network 14 and network 18 to client applications for consumption of the media). Accordingly, media distribution application 54 may allow one or more users to consume media, such as IPTV media, streaming video, and/or other media via respective client devices.

In an embodiment, the instruction sets and subroutines of media distribution application 54 may be stored, e.g., on storage device 16 associated with server computer 12, which executes media distribution application 54, and/or another suitable storage device. Further, users (e.g., one or more of users 36, 38, 40, 42) may access media distribution application 54 in order to consume media content. The users may access media distribution application 54 via one or more suitable applications, such as client side applications 10c1-10c4 (e.g., which may include a web browser, a media playback application, or another application) and/or via a different application (not shown). As generally discussed above, a portion and/or all of the functionality of quality of experience process 10 may be provided by one or more of client side applications 10c1-10c4. For example, in some embodiments quality of experience process 10 (and/or client-side functionality of quality of experience process 10) may be included within and/or interactive with client-side applications 10c1-10c4, which may include client side media playback and/or consumption applications, web browsers, or another application. Various additional/alternative configurations may be equally utilized.

As generally discussed above with reference to FIG. 2, quality of experience process 10 define 100 a lower media stream discontinuity threshold. Quality of experience process 10 may also evaluate 102 a media stream discontinuity rate associated with a portion of a media stream. When the media stream discontinuity rate associated with the portion of the media stream is greater than the lower media stream discontinuity threshold, quality of experience process 10 may further determine 104 a quality of experience associated with the portion of the media stream based upon, at least in part, a payload associated with the portion of the media stream.

For example, and as generally discussed above, in some embodiments quality of experience process 10 may allow a quality of experience associated with streaming media, such as streaming video, to be monitored. Further, in some embodiments, quality of experience process 10 may allow the quality of experience associated with streaming video to be monitored while reducing the amount of detailed (e.g., frame by frame) analysis performed on the video stream. For example, quality of experience process 10 may utilize a metric associated with the video steam as an indicator of a likely quality of experience associated with the streaming video. In an embodiment, the metric utilized by quality of experience process as an indicator of likely quality of experience for the streaming video may include packet discontinuity rate for the streaming video. In general, the packet discontinuity rate for the streaming video may include the number of lost packets occurring within a time period. Accordingly, quality of experience process 10 may only execute detailed analysis of the video stream when the packet discontinuity rate of the video stream indicates that the quality of experience associated with the video stream may possibly be unsatisfactory.

Consistent with the foregoing, quality of experience process 10 may define 100 a lower media stream discontinuity threshold. In general, the lower media stream discontinuity threshold may include a lower threshold discontinuity rate associated with a media stream that may be indicative of a packet loss rate for a portion of the media stream. In an embodiment, the lower media stream discontinuity threshold may include a discontinuity rate (e.g., a packet loss rate) for the media stream below which the discontinuity rate is unlikely to adversely impact the quality of experience associated with the media stream. That is, for example, if the packet loss rate for a video stream is less than the lower media stream discontinuity threshold, the packet loss rate (i.e., the media stream discontinuity rate) may be low enough that it may be assumed that the lost packets may not diminish the quality of experience for the video stream below an acceptable level.

In an embodiment, a single lower media stream discontinuity threshold may be defined 100 for all media streams. For example, the single lower media stream discontinuity threshold may include a discontinuity rate that is low enough that an actual discontinuity rate for a video stream that is less than the lower media stream discontinuity rate would not be likely to render the quality of experience associated with the video stream unsatisfactory, for all types of video streams. Consistent with such an embodiment, the single lower media steam discontinuity threshold may be applied to all video streams that may be monitored by quality of experience process 10.

In some embodiments, the lower media stream discontinuity threshold may vary for different video streams. For example, quality of experience process 10 may define 100 the lower media stream discontinuity threshold based on upon, at least in part, one or more media stream dimensions (e.g., one or more characteristics of the individual media stream for which the lower media stream discontinuity threshold is defined 100). In an embodiment, the lower media stream discontinuity threshold may be based on, at least in part, a video quality associated with the video stream. For example, a higher lower media steam discontinuity threshold may be utilized in connection with a standard definition video stream than may be utilized in connection with a high definition video stream. That is, a standard definition video stream may be capable of experiencing a higher discontinuity rate than a high definition video stream before the quality of experience is likely to become unsatisfactory.

In some embodiments, quality of experience process 10 may define 100 a lower media stream discontinuity threshold based upon, at least in part, a content type associated with a video stream. In some situations, depending upon the nature of the content of the video stream, the discontinuity rate at which the quality of experience associated with the video stream may become unsatisfactory may vary. For example, a video stream associated with an interview may not exhibit a great deal of change from one video frame to the next. As such, a relatively large discontinuity rate may not unsatisfactorily diminish the quality of experience for a user watching the interview. By contrast, a video stream associated with a sporting event, such as a hockey game, may include very dynamic video, exhibit a large degree of change from one video from to the next. As such, a relatively small discontinuity rate associated with the video stream of the hockey game may adversely impact the quality of experience for a user watching the video stream for the hockey game. As such, quality of experience process 10 may define 100 a relatively lower discontinuity rate as the lower media stream discontinuity threshold for a video stream associated with a sporting event and a relatively higher discontinuity rate as the lower media stream discontinuity threshold for an interview.

It will be appreciated that various different lower media stream thresholds may be defined 100 for different content types. Further, the number and nature of content types may be defined in a wide variety of manners and levels of granularity. For example, a general content type of "sports" may be utilized for video streams associated with video of any sporting event. In other embodiments, the content type may be defined with a high degree of granularity, for example, "dynamic sport" and "non-dynamic sport," or even by individual sport type (e.g., content type may be defined for "hockey," "football," "tennis," etc.). Various additional/alternative classifications, and sub-classifications, of content type may suitably be utilized. In some embodiments, quality of experience process 10 may define a different lower media discontinuity threshold for each content type and/or classification.

In some embodiments, quality of experience process 10 may define 100 lower media discontinuity thresholds based on other dimensions of the video stream. For example, quality of experience process 10 may define 100 the lower media stream discontinuity threshold based on, at least in part, the identity of the specific program. That is, quality of experience process 10 may define 100 different lower media stream discontinuity thresholds for different programs. In some embodiments, quality of experience process 10 may define 100 the lower media discontinuity threshold based on, at least in part, the time of day and/or day of the week at which the video stream is broadcast. Various additional and/or alternative video stream dimensions may be utilized.

In some embodiments, quality of experience process 10 may define 100 the lower media stream discontinuity threshold based on a combination of video stream dimensions. For example, quality of experience process 10 may define 100 the lower media stream discontinuity threshold based on, at least in part, the video quality, the content type, the day of the week, and the time of day of video stream broadcast. In such an example, each dimension of the video stream may influence the lower media stream discontinuity threshold. For example, based on each utilized dimension, the lower media stream discontinuity threshold may be adjusted up or down to achieve the defined 100 lower media stream discontinuity threshold. For example, a high definition video stream may adjust the threshold down (e.g., because a relatively lower discontinuity rate may diminish the quality of experience), while a less dynamic content type (such as an interview) may adjust the threshold up (e.g., because a relatively higher discontinuity rate may be tolerated without diminishing the quality of experience), and a primetime broadcast time may adjust the threshold down (e.g., because a relatively higher quality of experience may be expected for primetime broadcasts). In some embodiments, one or more weighting factors may be associated with each content dimension.

Consistent with the foregoing, in some embodiments, quality of experience process 10 may maintain multiple lower media stream discontinuity thresholds that may be defined 100 for different video streams, e.g., based upon, at least in part, one or more dimensions of each of the different video streams. In some embodiments, one or more dimensions of a video stream may be unknown and/or uncategorized for quality of experience process 10. In such a situation, quality of experience process 10 may not be able to define 100 a lower media stream discontinuity threshold based upon the unknown and/or uncategorized video stream dimension. In some embodiments, quality of experience process 10 may define 100 a default lower media stream discontinuity threshold for such video streams including one or more unknown and/or uncategorized dimensions. In some embodiments, quality of experience process 10 may define 100 the default lower media stream discontinuity threshold based upon, at least in part, any known dimensions of the video stream. For example, the content type of a video stream may not be known and/or categorized for use by quality of experience process 10, but the video quality (e.g., high definition, standard definition, etc.) and the broadcast time may be known and/or categorized for use by quality of experience process 10. In such an embodiment, quality of experience process 10 may define 100 the lower media stream discontinuity threshold based upon, at least in part, the known dimensions of the video stream. As will be described below, in some embodiments, the lower media stream discontinuity threshold defined 100 for a video stream having an unknown and/or uncategorized dimension may be adaptively and/or dynamically adjusted.

As generally described above, quality of experience process 10 may define 100 a lower media stream discontinuity threshold for a video stream. The lower media stream discontinuity threshold may be defined 100 such that, when the video stream is experiencing a discontinuity rate that is less than the lower media stream discontinuity threshold, it may be assumed that the discontinuity rate experienced by the video stream is low enough that the discontinuity rate is unlikely adversely impacting the video stream to such a degree that the quality of experience is unsatisfactory. Similarly, when the video stream is experiencing a discontinuity rate that is greater than the lower media stream discontinuity threshold, the discontinuity rate is possibly (but is not necessarily) adversely impacting the video stream to such a degree that the quality of experience may be (but is not necessarily) unsatisfactory.

In an embodiment, quality of experience process 10 may also define 106 an upper media stream discontinuity threshold. As generally described above, the lower media stream discontinuity threshold may include a media stream discontinuity rate below which media stream discontinuities may be unlikely to impact media quality of experience, and above which media stream discontinuities may possibly (e.g., but not necessarily) impact media quality of experience. In a similar manner, the upper media stream discontinuity threshold may include a discontinuity rate above which media stream discontinuities are likely to produce an unsatisfactory quality of experience. That is, the rate of packet loss for the media stream may be great enough that the quality of the video available at the end user device has been impacted to such an extent that the quality of experience of the media stream is probably unsatisfactory.

In a manner generally similar to the lower media stream discontinuity threshold, quality of experience process 10 may define 106 the upper media stream discontinuity threshold based upon, at least in part, a single discontinuity rate that may be utilized in connection with all video streams. In some embodiments, quality of experience process 10 may define 106 the upper media stream discontinuity threshold based upon, at least in part, one or more dimensions of the video stream. In this regard, the details discussed with respect to defining 100 the lower media stream discontinuity threshold may be applicable in a complimentary manner to defining 106 the upper media stream discontinuity threshold. As such, quality of experience process 10 may defining 106 the upper media stream discontinuity threshold based upon, at least in part, one or more media stream dimensions (e.g., such as content type, video quality, time of broadcast, etc.), which may in some embodiments be weighted. Further, quality of experience process 10 may define 106 an upper media stream discontinuity threshold for a media stream having one or more unknown and/or uncategorized media stream dimensions based upon, at least in part a default upper media stream discontinuity threshold. The default upper media stream discontinuity threshold may be adaptively and/or dynamically adjusted, e.g., in a manner as described below. Consistent with the forgoing, maintain one, or a plurality of, upper media stream discontinuity thresholds, that may be associated with one or more media streams.

Figure 3:
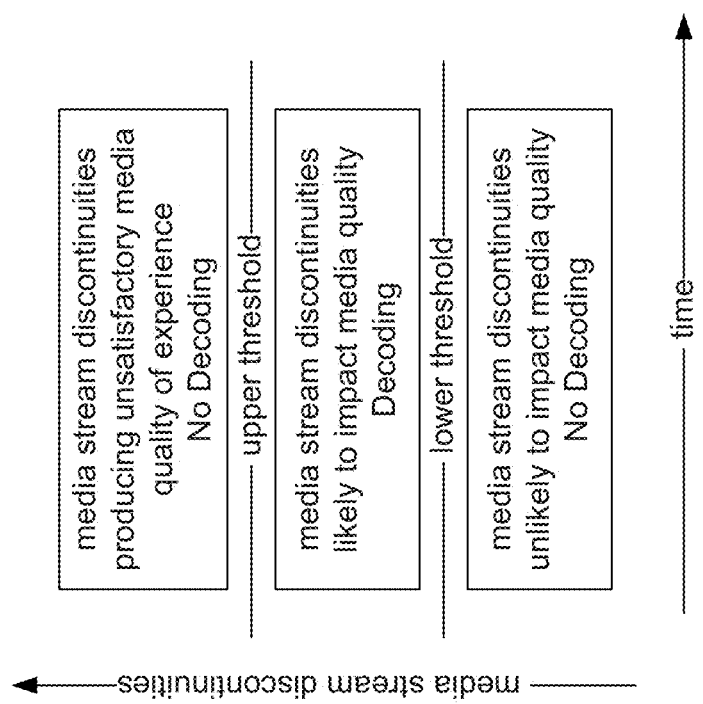
FIG. 3 diagrammatically depicts an implementation of the quality of experience process according to an example embodiment of the present disclosure.

As generally described above, and referring also to FIG. 3, in an embodiment, quality of experience process 10 may define 100 a lower media stream discontinuity threshold and may also define 106 an upper media stream discontinuity threshold. Together, the lower media stream discontinuity threshold and the upper media stream discontinuity threshold may define a window of discontinuity rates that are likely to impact the quality of experience of the streaming video for the user to some degree. However, the extent to which the media stream discontinuities within the window of discontinuity rates may impact the quality of experience of the streaming video is uncertain. That is, the media stream discontinuities may impact the streaming video to such a degree that the quality of experience may be unsatisfactory. However, it may also be possible that, while the media stream discontinuities may impact the streaming video quality, the resulting quality of experience may still remain satisfactory. As such, the window defined by the lower media stream discontinuity threshold and the upper media stream discontinuity threshold is a range of discontinuity rates for which the quality of experience for the streaming video is uncertain. As shown, for example, in FIG. 4, in addition to the lower media stream discontinuity threshold and the upper media stream discontinuity threshold, one or more additional discontinuity thresholds may also be defined.

In some embodiments, the lower media stream discontinuity threshold and/or the upper media stream discontinuity thresholds may be based upon, at least in part, historical data. For example, determinations of satisfactory and/or unsatisfactory quality of experience may be made for media streams, and may be correlated with the discontinuity rate for the media stream during the satisfactory and/or unsatisfactory quality of experience. It will be appreciated that the quality of experience associated with a media stream may vary over time, and similarly, the media stream discontinuity rate may similarly vary over time. Accordingly, determinations of satisfactory and/or unsatisfactory quality of experience for a media stream and the correlated discontinuity rate for the media stream may be based on a common time period or portion of the media stream. In this manner, the observed quality of experience may relate to the discontinuity rate.

The historical data correlating satisfactory and/or unsatisfactory quality of experience and discontinuity rate may further be correlated with one or more media stream dimensions, such as content type, video quality, time of day, program information, etc. Based on the historical data, lower media stream discontinuity thresholds may be associated with various media stream dimensions such that discontinuity rates below the lower media stream discontinuity threshold may be correlated to a satisfactory quality of experience for the respective media stream dimensions. Similarly, based on the historical data, upper media stream discontinuity thresholds may be associated with various media stream dimensions such that discontinuity rates above the upper media stream discontinuity threshold may be correlated to an unsatisfactory quality of experience for the respective media stream dimensions.

Figure 4:
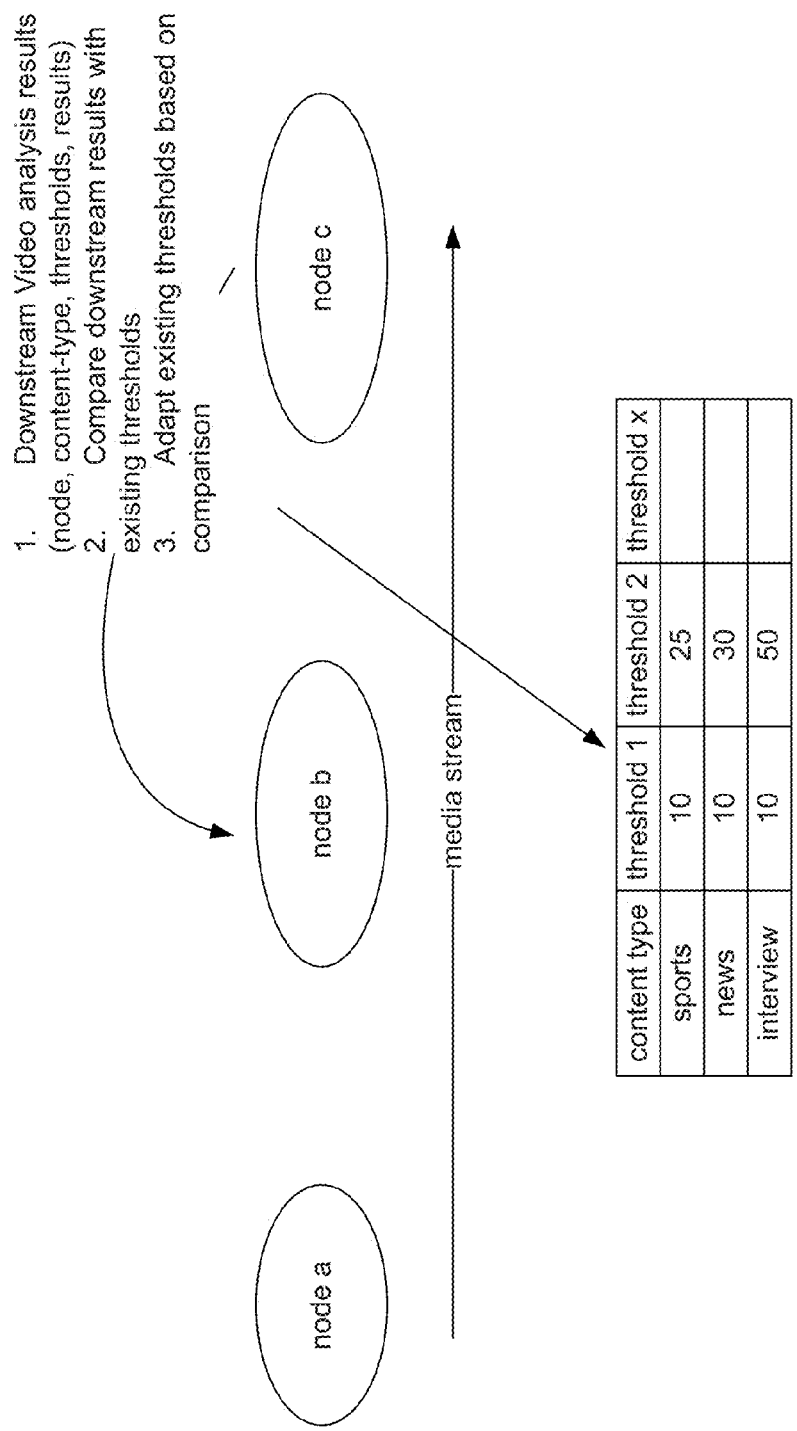
FIG. 4 diagrammatically depicts an implementation of the quality of experience process according to an example embodiment of the present disclosure.
Figure 5:
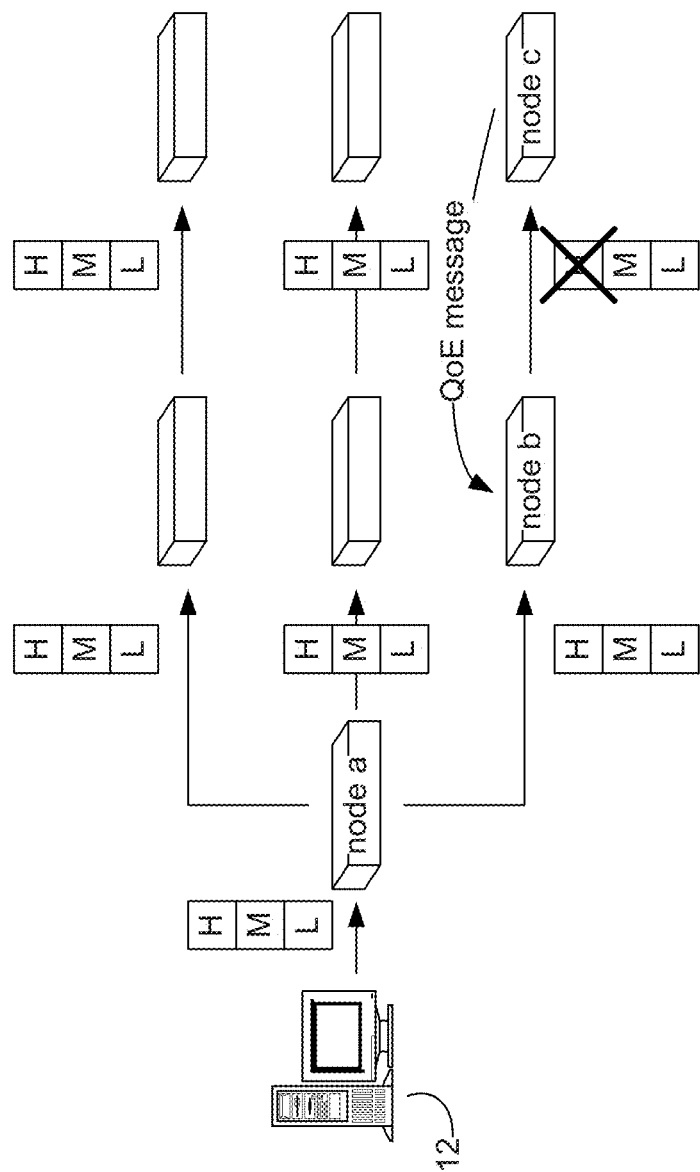
FIG. 5 diagrammatically depicts an implementation of the quality of experience process according to an example embodiment of the present disclosure.

Quality of experience process 10 may also evaluate 102 a media stream discontinuity rate associated with a portion of a media stream. Evaluating 102 a media stream discontinuity rate associated with a portion of the media stream may include tracking the incoming packets associated with the portion of the media stream and determining how many, if any, packets are missing from the portion of the media stream. In an embodiment, evaluating the media stream discontinuity rate may include evaluating header information of the packets of the media stream to determine the discontinuity level associated with the portion of the media stream. In some embodiments, quality of experience process 10 may evaluate 102 the media stream discontinuity rate associated with the media stream by one or more network nodes included in the network path for the video stream between the video source (e.g., video distribution application 54/server computer 12) and an end user media consumption device (such as a client electronic device). For example, as shown in FIGS. 4 and 5, server computer 12 (executing media distribution application 54) may be coupled to one or more network traffic distribution nodes (e.g., node a, node b, and node c). In some embodiments, one, or more than one, of node a, node b, node c may evaluate the media stream for possible errors by tracking the number of packet discontinuities, such as MPEG-TS packet discontinuities, in an embodiment in which the video stream may include a MPEG-TS. As such, quality of experience process 10 (and/or instantiations thereof) may be deployed at one or more nodes along the network path, and/or functionality of quality of experience process 10 may be implemented at one or more nodes along the network path. In some embodiments, functionality (e.g., evaluating 102 media stream discontinuity rate, determining 104 quality of experience, etc.) of quality of experience process 10 may be implemented at one or more nodes along the network path, and may be managed, e.g., by centrally deployed (e.g., on server computer 12) quality of experience process.

In an embodiment, evaluating 102 the media stream discontinuity rate associated with a portion of the media stream may include defining a window size (e.g., in seconds) over which the packet discontinuities may be monitored. An amount of the media stream the size of the defined window may be constantly buffered. In an embodiment, the buffer may be continuously emptied and refilled using a sliding window type buffer. A number of media stream packet discontinuities may be computed at a first time (e.g., time t1), which may be a time corresponding to the beginning time of the buffer window. Further, the number of media stream packet discontinuities may be computed at a second time (e.g., time t2), which may be a time corresponding to the end of the buffer window. As described above, the media stream packet discontinuities may be computed at one, or more than one, node.

In an embodiment in which the media stream may include an MPEG Transport Stream (e.g., an MPEG TS), the MPEG TS may include a system for multiplexing multimedia content into a single stream for transmission. An MPET TS may include a series of "programs" each containing a collection of "elementary" streams. These elementary streams may include either the video, audio, or data (e.g., subtitles, etc.) track for a particular program. These elementary streams may be divided up into small MPEG TS packets. The MPEG TS packets for all program, including their respective elementary streams, may be multiplexed to produce the MPEG Transport stream. An MPEG TS discontinuity may occur when an MPEG TS packet for a particular elementary stream is lost. The loss of an MPEG TS packet may result in the content being supplied by the elementary stream, to have some degradation in quality due to the missing data from the lost packet.

When the media stream discontinuity rate associated with the portion of the media stream is greater than the lower media stream discontinuity threshold, quality of experience process 10 may further determine 104 a quality of experience associated with the portion of the media stream based upon, at least in part, a payload associated with the portion of the media stream. As generally described above, when the media stream discontinuity rate is less than the lower media stream discontinuity threshold, the quality of experience associated with the portion of the media stream may be considered to be satisfactory. However, when the media stream discontinuity rate is greater than the lower media stream discontinuity threshold, it may be possible that the quality of experience associated with the portion of the media stream may be impacted to such a degree that the quality of experience associated with the portion of the media stream may not be satisfactory. Accordingly, when the media stream discontinuity rate associated with the portion of the media stream is greater than the lower media stream discontinuity rate, quality of experience process 10 may determine 104 the quality of experience associated with the portion of the media stream, e.g., to determine whether the quality of experience is actually satisfactory, or if it is unsatisfactory. Accordingly, determining the quality of experience associated with the portion of the media stream may allow quality of experience process 10 to maintain a satisfactory quality of experience for the media stream without incurring excessive computational loads by reducing the number of frames (e.g., to include only those frame having a discontinuity rate greater than the lower media stream discontinuity threshold) may be analyzed to determine the actually quality of experience associated with the portion of the media stream.

In some embodiments, determining 104 the quality of experience associated with the portion of the media stream may include determining the quality of experience associated with the portion of the media stream when the media stream discontinuity rate associated with the portion of the media stream is less than the upper media stream discontinuity threshold. Accordingly, determining the quality of experience associated with the portion of the media stream may allow quality of experience process 10 to maintain a satisfactory quality of experience for the media stream without incurring excessive computational loads by reducing the number of frames (e.g., to include only those frame having a discontinuity rate less than the upper media stream discontinuity threshold) may be analyzed to determine the actually quality of experience associated with the portion of the media stream. In combination with determining the quality of experience associated with portions of the media stream having a discontinuity rate greater than the lower media stream discontinuity rate, only portions of the media stream having a discontinuity rate indicative of an unknown quality of experience may be analyzed to determine the actual quality of experience.

For example, and as discussed above, the lower media stream discontinuity threshold may be defined such that, for a given program, content type, etc., discontinuity rates less than the lower media stream discontinuity rate may be consider to not have such a large impact on the quality of experience associated with the media stream to render the quality of experience unsatisfactory. Similarly, the upper media stream discontinuity threshold may be defined such that, for a given program, content type, etc., discontinuity rates greater than the upper media stream discontinuity threshold may be considered to have such a large impact on the quality of experience of the media stream so as to render the quality of experience unsatisfactory, As such, for a given program, content type, etc., discontinuity rates for a media stream between the lower media stream discontinuity threshold and the upper media stream discontinuity threshold may result in an uncertain quality of experience. That is, the quality of experience may be satisfactory, or may be unsatisfactory. In such a situation, quality of experience process 10 may determine 104 the quality of experience associated with the portion of the media stream. By determining 104 the quality of experience associated with media streams having a discontinuity rate between the lower media stream discontinuity threshold and the upper media stream discontinuity threshold, computational resources may be conserved, e.g., by not determining the quality of experience associated with media stream portion have a higher or lower discontinuity threshold.

Quality of experience process 10 may determine 104 the quality of experience associated with a portion of a media stream using a variety of mechanisms or processes, as may be generally known. Generally, determining 104 the quality of experience associated with the portion of the media stream may include decoding 108 a payload of the portion of the media stream. For example, the individual frames of video content associated with the portion of the media stream may be decoded and evaluated to determine a quality of experience associated with the portion of the media stream. It will be appreciated that a variety of techniques and methodologies may be implemented for determining 104 the quality of experience associated with a portion of the media stream.

According to one example technique for determining 104 the quality of experience associated with a portion of a media stream a comparison may be made between two hash values for the same frame of video in order to assess whether the visual content of the frame has changed. For example, at a first point (e.g., a media distribution application or an upstream node within a media distribution network) a collection of hash values may be produced for each frame in a video sequence that is to be transmitted. The hash values may be multicast to one or more downstream nodes (e.g., which may include one or more terminal, or end user, nodes) that may be responsible for transporting the video sequence. To evaluate the quality of experience associated with a portion of the streaming media, a downstream node (e.g., which may be tasked with transporting the video sequence) may join the multicast group and may begin to decode the video (e.g., decode individual frames of the video content). Further, the one or more downstream nodes compare the decoded hash values for each frame with the corresponding value in the list multicast by the upstream node or video distribution application. In a situation in which the hash value for the current decoded frame does not match the corresponding stored hash value, the stored value list may be searched for the corresponding value. If the corresponding value is found, it may be the case that a previous frame has not been decoded due to data loss. This may be termed a "lost frame". However, if a hash value does not match, and a corresponding has value has not been found within the stored value list it may be determined that the visual content has been altered in some manner leading to a different hash value being computed. This may be termed a "damaged frame". Further, if the hash value for the decoded frame matches the corresponding stored value, no errors may have occurred and no action may be necessary. In some situations, an offset may be maintained to account for 1) how far into the sequence the comparison process was started, and/or 2) video frames that were not decoded due to data loss. In some situations, the offset facilitate use of the appropriate values for the decoded and stored frames for comparison. In some circumstances, through the use of the offset and a search of future frame values, the techniques may also detect lost video frames. In some implementations, counts may be maintained of lost and damaged frames for quality monitoring purposes which may be periodically reported to the service provider, may be periodically reported upstream to the previous node(s) in the video path, and/or may be used to make local decisions regarding modification of the video stream.

In some embodiments, one or more of the lower media stream discontinuity rate and the upper media stream discontinuity rate may dynamically adjusted, for example, based upon, at least in part, the determined 104 quality of experience associated with the portion of the media stream. As generally described, in some embodiments, the lower media stream discontinuity threshold may define a discontinuity rate, below which the quality of experience for the media stream may be considered to be satisfactory. Similarly, the upper media stream discontinuity rate may define a discontinuity rate, above which the quality of experience for the media stream may be considered to be unsatisfactory. However, for discontinuity rates associated with the media stream that are between the lower media stream discontinuity rate and the upper media stream discontinuity rate, the quality of experience may be uncertain, and quality of experience process 10 may determine 104 the quality of experience. Over time, as the quality of experience is determined 104 at different discontinuity rates between the lower media stream discontinuity threshold and the upper media stream discontinuity threshold, the ranges of discontinuity rates providing a satisfactory quality of experience, and unsatisfactory quality of experience, and an unknown quality of experience may be refined.

For example, and referring also to FIG. 4, in an embodiment a lower media stream discontinuity thresholds and an upper media stream discontinuity threshold may be defined 100, 106 for media streams having various different media stream dimensions or characteristics. For example, in the illustrated embodiment of FIG. 4, different lower media stream discontinuity rates and upper media stream discontinuity rates may be defined 100, 106 for media streams associated with different content types. As described above, in response to evaluating 102 a media stream discontinuity rate, and determining that the media stream discontinuity rate is between the lower media stream discontinuity threshold and the upper media stream discontinuity threshold, quality of experience process 10 may determine 104 a quality of experience associated with the portion of the media stream, e.g., as by decoding 108 the payload of media stream packets associated with the portion of the media stream. For example, as shown in FIG. 4, a lower media stream discontinuity rate of 10 lost packets per sampling timeframe may be defined 100 for sports programs. Further, an upper media stream discontinuity rate of 25 lost packets per sampling timeframe may be defined 106 for sports programs. In such an example embodiment, it may be determined that a media stream discontinuity rate less than 10 may not render the quality of experience of a sports program unsatisfactory, and that a media stream discontinuity rate greater than 25 will always render the quality of experience of a sports program unsatisfactory. However, it may be necessary to actually determine 104 the quality of experience resulting from a media stream having a discontinuity rate between 10 and 25 to determine whether the quality of experience is satisfactory or unsatisfactory. It will be appreciated that the discontinuity thresholds of 10 and 25 are provided only for the purpose of illustration, and should not be construed as a limitation.

Quality of experience process 10 may increase 110 the lower media stream discontinuity threshold when the quality of experience associated with the portion of the media stream is satisfactory. For example, and continuing with the above example, over time it may be determined (e.g., based on actually determining 104 the quality of experience) that a media stream discontinuity rate of 11 provides a satisfactory quality of experience. Similarly, it may also be determined that a media stream discontinuity rate of 12 provides a satisfactory quality of experience as well. However, it may be determined that a media stream discontinuity rate of 13 may sometimes provide a satisfactory quality of experience, and may sometimes provide an unsatisfactory quality of experience. Accordingly, it may be determined that for a discontinuity rate of 12 or less, the quality of experience may be satisfactory. In such a situation, quality of experience process 10 may increase 110 the lower media stream discontinuity threshold to 12 for the sports program. Accordingly, in the future, quality of experience process 10 may determine 104 a quality of experience associated with the media stream (e.g., a media stream for a sports program) when the evaluated 102 discontinuity rate for a portion of the media stream is greater than 12. Quality of experience process 10 may increase 110 the lower media stream discontinuity threshold for only the specific media stream (e.g., for a specific sports program), for all media streams having a common media stream dimension or characteristic (e.g., content type, broadcast time, video definition/quality, etc., as generally discussed above), etc.

In a generally corresponding manner, quality of experience process 10 may decrease 112 the lower media stream discontinuity threshold when the quality of experience associated with the portion of the media stream is unsatisfactory. Continuing with the example of a lower media stream discontinuity threshold of 10, quality of experience process 10 may determine 104 the quality of experience associated with a portion of a media stream having a discontinuity rate of 10 or greater. In response to evaluating 102 a discontinuity rate associated with a program as being 10, quality of experience process 10 may determine 104 the quality of experience associated with the portion of the media stream. Quality of experience process 10 may determine 104 that the quality of experience associated with a portion of the media stream having a discontinuity rate of 10 is sometime satisfactory and sometimes unsatisfactory. Accordingly, quality of experience process 10 may decrease 112 the lower media stream discontinuity threshold below 10, e.g., indicating that quality of experience associated with a media stream discontinuity of 10 is sometimes satisfactory and sometimes unsatisfactory, and therefore necessitates an evaluation of the actual media payload to determine the quality of experience.

In various embodiments, various parameters may be established for adjusting (e.g., either increasing 110 or decreasing 112) the lower media stream discontinuity threshold. For example, quality of experience process 10 may dynamically adjust the lower media stream discontinuity threshold the first time the quality of experience is determined to be satisfactory (e.g., for increasing 110 the threshold) or unsatisfactory (e.g., for decreasing the threshold), may dynamically adjust the lower media stream discontinuity threshold after a defined number of quality of experience determinations, or utilizing another suitable parameter.

In a generally corresponding manner, the upper media stream discontinuity threshold may also be dynamically adjusted. For example, the quality of service may be determined for portions of the media stream having a discontinuity rate at or near the upper media stream discontinuity threshold. If the quality of experience is consistently (e.g., based on a defined parameter) unsatisfactory, the upper media stream discontinuity threshold may be lowered. In a related manner, if the quality of experience is sometimes satisfactory and sometimes unsatisfactory, the upper media stream discontinuity threshold may be increased, e.g., to reflect the quality of experience uncertainty around the upper threshold.

In some embodiments, adjusting the media stream discontinuity thresholds may allow suitable thresholds to be established for content having unknown performance parameters. For example, a new piece of content, content type, video quality, etc., may be distributed by media distribution application 54. The discontinuity rates at which the quality of experience associated with the new piece of content may be satisfactory, unsatisfactory, or unknown/variable may not be known. In such a situation, general media stream discontinuity thresholds may be initially set. Quality of experience process 10 may then dynamically adjust the media stream discontinuity thresholds based on the quality of experience determined 104 over time for different discontinuity rates. Further, in some embodiments, dynamically adjusting the media stream discontinuity thresholds may allow computation expenditure associated with actually determining the quality of experience associated with a media stream to be optimized. For example, by adjusting the media stream thresholds, the actual quality of experience may not be determined for discontinuity rates at which the quality of experience is consistently satisfactory or consistently unsatisfactory.

In a generally similar manner as described previously, the media stream discontinuity thresholds may be adjusted by one, or more than one, node along the media stream distribution network. For example, as shown in the illustrative example of FIG. 4, media stream discontinuity thresholds may be defined for media streams (e.g., based on content type). In an embodiment, one or more nodes may evaluate 102 a discontinuity rate for each media stream distributed through the network (e.g., including node a, node b, and node c). If a portion of one of the media streams is determined to have a discontinuity rate between the lower media stream discontinuity threshold, and the upper media stream discontinuity threshold, quality of experience process 10 may determine 104 the quality of experience associated with the portion of the media stream. The results of the determination 104 may, in some embodiments, be transmitted to one or more upstream nodes. For example, node c may pass the results of the quality of experience determination 104 for a portion of a media stream to node b. Based on the results of the quality of experience determination 104, node b may compare the results to the thresholds, and may adjust the thresholds as appropriate (e.g., based on whether the quality of experience is satisfactory or unsatisfactory, and based upon, at least in part, the parameters for adjusting the media stream discontinuity thresholds). Quality of experience process 10 may subsequently determine 104 the quality of experience associated with a portion of a media stream (e.g., at node c, or another point within the distribution network) based upon, at least in part, a modified media stream threshold.

According to some embodiments, determining 104 the quality of experience associated with a portion of a media stream may allow quality of experience process 10 to take one or more remedial and/or curative actions with respect to the quality of experience associated with the media stream. The quality of experience may be based on, not only the determined 10 quality of experience associated with portions of the media stream having a discontinuity rate between the lower media stream discontinuity threshold and the upper media stream discontinuity rate, but also on portions of the media stream having a discontinuity rate less than the lower media stream discontinuity threshold (and therefore assumed to have a satisfactory quality of experience), as well as on portions of the media stream having a discontinuity rate greater than the upper media stream discontinuity rate (and therefore assumed to have an unsatisfactory quality of experience). For example, remedial actions may take a number of different implementations, such as reporting the quality of experience issue (e.g., an unsatisfactory quality of experience) to a management system, reporting back up the network path to one or more upstream nodes (e.g., relative to the node at which the determination 104 of the quality of experience is made), re-routing of packets associated with the media stream to improve the quality of experience (e.g., in which a decrease in quality of experience is associated with one or the nodes along the network path), downgrading the media stream to a lower, but still reasonable quality (e.g., thereby allowing consumption with fewer errors in the media stream), or the like.

For example, in an embodiment quality of experience process 10 may be implemented to enable a media content provider (e.g., providing internet protocol TV) and/or a network operator to easily monitor video flows that take place in a video stream between a video server (e.g., media distribution application 54) an end user media consumption devices (e.g., one or more of client electronic devices 28, 30, 32, 34). In an example of such an implementation, data concerning media stream (e.g., MPEG TS) discontinuities, detailed frame analysis measurements, unwatchable seconds of streaming media, etc., may be collected and monitored. Such data may be logged for troubleshooting purposes. In some embodiments, the collected and monitored data may be continuously and/or periodically pushed back to the video service provider, e.g., for customer experience management. In some embodiments, the collected and monitored data may also allow a system operator (e.g., an internet protocol TV operator) to determine the existence and degree of any bottlenecks or problems in the media distribution network. Further, the collection and monitoring of such data may enable a media distribution operator to validate Service Level Agreements (SLA's) with third party network operators whose networks are being used to host or transport the media to end users.

Determining 104 the quality of experience associated with a portion may enable client side (e.g., end consumer device) driven or in-network media adaptation. For example, in the case of video media, video monitoring at the client endpoint may be utilized to trigger quality adaptation requests to be sent to the video server (e.g., media distribution application 54). In response to the adaptation requests the media distribution application 54 (alone and/or in conjunction with quality of experience process 10 and/or another application or process) may modify the encoding mechanism, and/or another characteristic of the streaming media. Such an implementation may, for example, enable a unicast video to be modified in network nodes.

According to an implementation of the foregoing, in an embodiment quality of experience process 10 may reduce 114 a bandwidth requirement of a the media stream when the quality of experience is unsatisfactory. For example, and referring also to FIG. 5, an example of in-network monitoring of quality and adaption for unicast and/or multicast media broadcast is generally depicted. For example, quality of experience process 10 may enable real time (or near real time) in network media quality adaption for multicast (or unicast) media streams. In one such implementation, one or more nodes (e.g., one or more of node a, node b, and node c) in the media distribution network may be capable of dynamically stripping elements from the media steam (e.g., which may include a video stream, in the case of an IPTV network, or other streaming video network) before forwarding a reduced quality variant of the media stream to the next, downstream, node in the network.

For example, as shown in FIG. 5, each of node a, node b, and node c may monitor a quality of experience (e.g., via a combination of evaluating 102 a media stream discontinuity rate and determining 104 a quality of experience associated with a portion of the media stream) associated with streaming video content passing through the node. Further, one or more of node a, node b, and node c may detect that the quality of experience associated with the streaming video content is unsatisfactory (e.g., based upon, at least in part, an evaluated 102 media stream discontinuity rate greater than the upper media stream discontinuity threshold and/or a determined 104 unsatisfactory quality of experience). For example, in FIG. 5, node c may detect that the quality of experience associated with the streaming video content is unsatisfactory. Node c may send a message (e.g., QoE message) to an upstream node (e.g., node b) indicating the quality degradation in the streaming video content. In response to the received QoE message, quality of experience process 10 may reduce 114 the bandwidth requirements of the media stream passed from node b to node c. For example, at node b video elements may be stripped from the streaming video producing a lower bandwidth version of the steaming video content in an effort to alleviate the bottleneck or loss causing the video quality degradation. For example, as shown, the streaming video distributed through the network may be available as high resolution video (H, e.g., which may include high definition video content), medium resolution video (M, e.g., which may include standard definition video content), and low resolution video (L, e.g., which may include low definition video content). In response to receiving the QoE message, node b may strip out video elements of the streaming video content passed to node c, such that only medium resolution video (M) and low resolution video (L) may be available at node c. Accordingly, even though the video quality available at node c may be lower (e.g., lower than the high definition video content) the overall quality of experience provided by the lower quality video may be higher, e.g., due to less noise, pixilation, frozen or lost frames, etc.

Consistent with the foregoing, in some situations only endpoints that are connected to the video server (e.g., media distribution application 54) via an unreliable or congested link (e.g., which may give rise to a relatively high discontinuity rate, or otherwise decreased quality of experience) may received the reduced quality video stream. Other endpoints may receive a higher quality original video stream that was transmitted by the video server. Further, in some situations the logic to modify the video stream may be deployed in the network (e.g., at node a, node b, node c, etc.), e.g., by deploying instantiations of quality of experience process 10, and/or functionality of quality of experience process 10, at one or more of node a, node b, and node c. In such an implementation communication with the video server may not be required to adapt the quality of the video transmitted to downstream nodes. Accordingly, the amount of signaling overhead may be reduced (e.g., as nodes in the network may only need to communicate with an upstream node) which still achieving adaptive media quality transmission for improving end user quality of experience.

Figure 6:
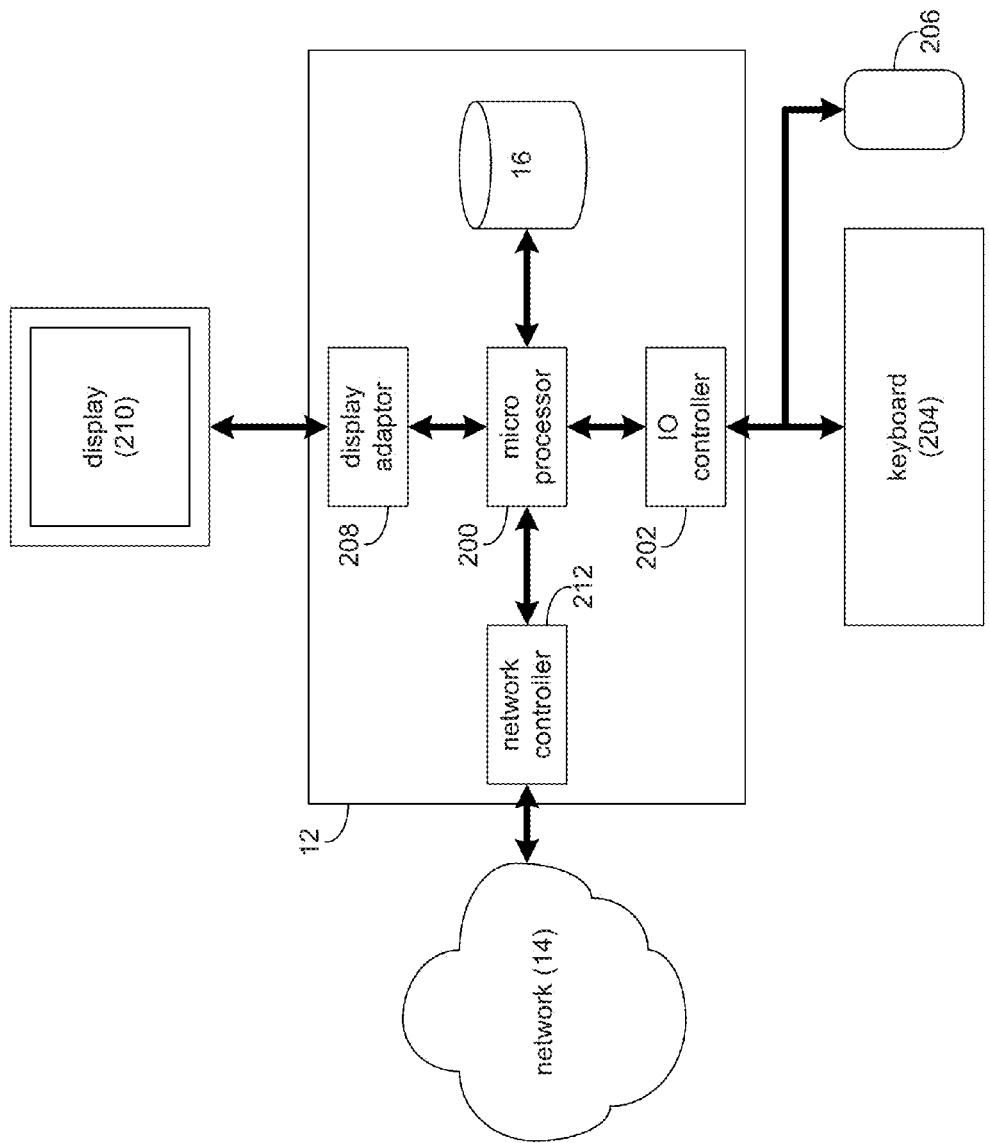
FIG. 6 is a diagrammatic view of the computing device of FIG. 1, according to an implementation of the present disclosure.

Referring also to FIG. 6, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, quality of experience process 10 may be substituted for computing device 12 within FIG. 6, examples of which may include but are not limited to client electronic devices 28, 30, 32, 34.

Computing system 12 may include microprocessor 200 configured to e.g., process data and execute instructions/code for quality of experience process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, C#.NET, PHP, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 200) of a general purpose computer/special purpose computer/other programmable data processing apparatus (e.g., computing device 12), such that the instructions, which execute via the processor (e.g., processor 200) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
defining, by a processor, a lower media stream discontinuity threshold, wherein the lower media stream discontinuity threshold is adaptively defined based upon, at least in part, a temporal aspect and a classification of a content type as determined by a dynamic nature of the content type;

evaluating, by the processor, a media stream discontinuity rate associated with a portion of a media stream, wherein the media stream discontinuity rate includes an indicator of likely quality of experiences for the portion of the media stream, wherein the portion of the media stream is evaluated based upon a window size over which the portion of the media stream discontinuity rate is monitored;

determining that the media stream discontinuity rate associated with the portion of the media stream is greater than the lower media stream discontinuity threshold;

in response to determining that the media stream discontinuity rate associated with the portion of the media stream is greater than the lower media stream discontinuity threshold, determining, by the processor, an actual quality of experience associated with the portion of the media stream based upon, at least in part, a payload associated with the portion of the media stream; and increasing the lower media stream discontinuity threshold when the quality of experience associated with the portion of the media stream is determined to be satisfactory.

2. The computer-implemented method of claim 1, wherein defining the lower media stream discontinuity threshold is based upon, at least in part, one or more media stream dimensions.

3. The computer-implemented method of claim 1, wherein determining the actual quality of experience associated with the portion of the media stream includes decoding a payload of the portion of the media stream.

4. The computer-implemented method of claim 1, further including defining an upper media stream discontinuity threshold;

wherein determining the quality of experience associated with the portion of the media stream includes determining the quality of experience associated with the portion of the media stream when the media stream discontinuity rate associated with the portion of the media stream is less than the upper media stream discontinuity threshold.

5. The computer-implemented method of claim 4, further including decreasing the lower media stream discontinuity threshold when the quality of experience associated with the portion of the media stream is unsatisfactory.

6. The computer-implemented method of claim 1, further including reducing a bandwidth requirement of the media stream when the quality of experience is unsatisfactory.

7. A computer program product comprising a non-transitory computer readable storage medium having a plurality of instructions stored thereon, which, when executed by a processor, cause the processor to perform operations including:

defining a lower media stream discontinuity threshold, wherein the lower media stream discontinuity threshold is adaptively defined based upon, at least in part, a temporal aspect and a classification of a content type as determined by a dynamic nature of the content type;

evaluating a media stream discontinuity rate associated with a portion of a media stream, wherein the media stream discontinuity rate includes an indicator of likely quality of experiences for the portion of the media stream, wherein the portion of the media stream is evaluated based upon a window size over which the portion of the media stream discontinuity rate is monitored;

determining that the media stream discontinuity rate associated with the portion of the media stream is greater than the lower media stream discontinuity threshold;

in response to determining that the media stream discontinuity rate associated with the portion of the media stream is greater than the lower media stream discontinuity threshold, determining an actual quality of experience associated with the portion of the media stream based upon, at least in part, a payload associated with the portion of the media stream; and increasing the lower media stream discontinuity threshold when the quality of experience associated with the portion of the media stream is determined to be satisfactory.

8. The computer program product of claim 7, wherein defining the lower media stream discontinuity threshold is based upon, at least in part, one or more media stream dimensions.

9. The computer program product of claim 7, wherein the instructions for determining the actual quality of experience associated with the portion of the media stream include instructions for decoding a payload of the portion of the media stream.

10. The computer program product of claim 7, further including instructions for defining an upper media stream discontinuity threshold;

wherein determining the quality of experience associated with the portion of the media stream includes determining the quality of experience associated with the portion of the media stream when the media stream discontinuity rate associated with the portion of the media stream is less than the upper media stream discontinuity threshold.

11. The computer program product of claim 10, further including instructions for decreasing the lower media stream discontinuity threshold when the quality of experience associated with the portion of the media stream is unsatisfactory.

12. The computer program product of claim 7, further including instructions for reducing a bandwidth requirement of the media stream when the quality of experience is unsatisfactory.

13. A computing system comprising:

a processor and a memory architecture coupled with the processor, the processor configured for:

defining a lower media stream discontinuity threshold, wherein the lower media stream discontinuity threshold is adaptively defined based upon, at least in part, a temporal aspect and a classification of a content type as determined by a dynamic nature of the content type;

evaluating a media stream discontinuity rate associated with a portion of a media stream, wherein the media stream discontinuity rate includes an indicator of likely quality of experiences for the portion of the media stream, wherein the portion of the media stream is evaluated based upon a window size over which the portion of the media stream discontinuity rate is monitored;

determine that the media stream discontinuity rate associated with the portion of the media stream is greater than the lower media stream discontinuity threshold;

in response to determining that the media stream discontinuity rate associated with the portion of the media stream is greater than the lower media stream discontinuity threshold, determining an actual quality of experience associated with the portion of the media stream based upon, at least in part, a payload associated with the portion of the media stream; and increasing the lower media stream discontinuity threshold when the quality of experience associated with the portion of the media stream is determined to be satisfactory.

14. The computing system of claim 13, wherein determining the actual quality of experience associated with the portion of the media stream includes decoding a payload of the portion of the media stream.

15. The computing system of claim 13, wherein the processor is further configured for defining an upper media stream discontinuity threshold;
   wherein determining the quality of experience associated with the portion of the media stream includes determining the quality of experience associated with the portion of the media stream when the media stream discontinuity rate associated with the portion of the media stream is less than the upper media stream discontinuity threshold.

16. The computing system of claim 15, wherein the processor is further configured for decreasing the lower media stream discontinuity threshold when the quality of experience associated with the portion of the media stream is unsatisfactory.

17. The computing system of claim 13, wherein the processor is further configured for reducing a bandwidth requirement of the media stream when the quality of experience is unsatisfactory.

\* \* \* \* \*